Aug. 30, 1966     C. Z. WALSH     3,270,332
APPARATUS INCLUDING A MAGNET CLAMP FOR INDICATING
AN ELECTRICALLY GROUNDED CONDITION
Original Filed Feb. 13, 1961     2 Sheets—Sheet 1
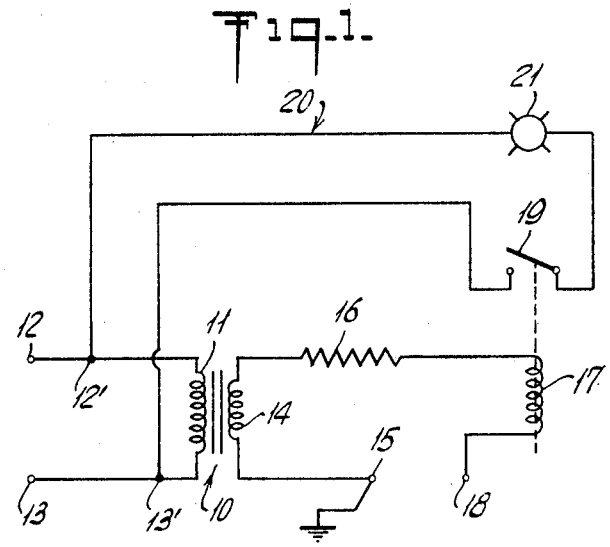
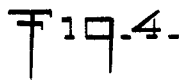
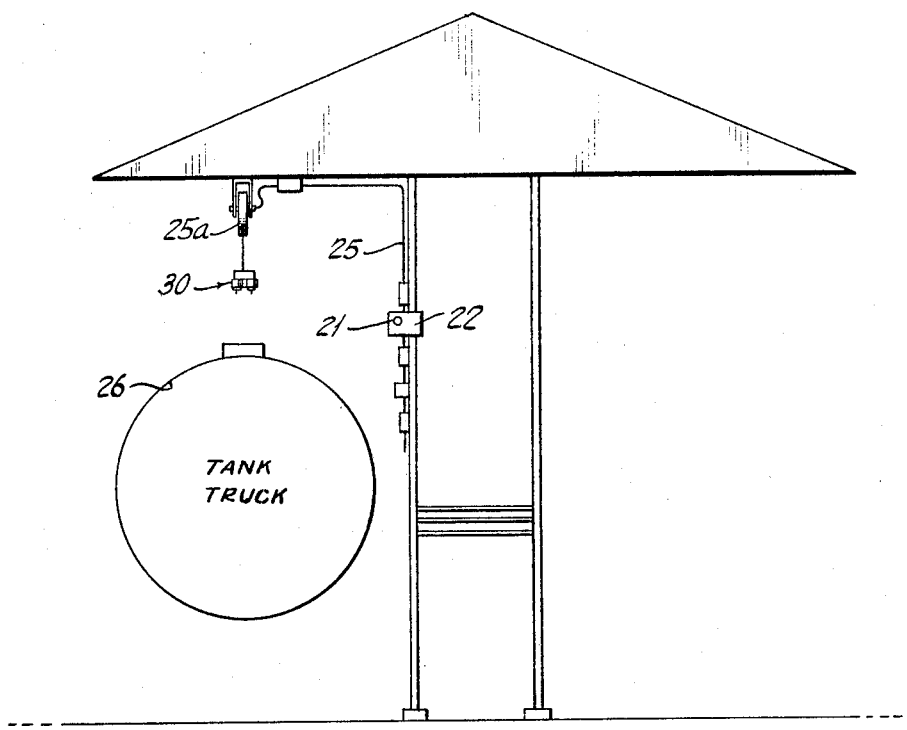

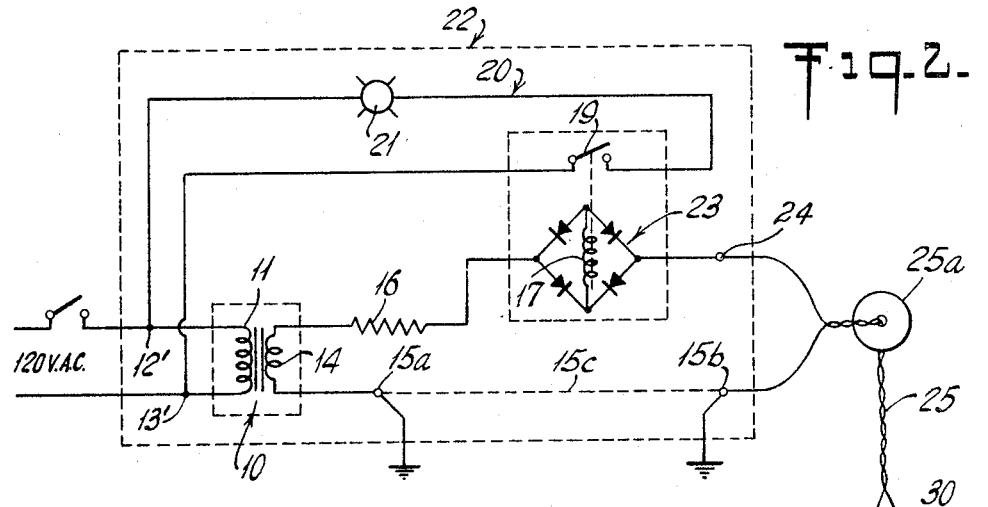

United States Patent Office 3,270,332
Patented August 30, 1966

3,270,332
APPARATUS INCLUDING A MAGNET CLAMP FOR INDICATING AN ELECTRICALLY GROUNDED CONDITION
Carl Z. Walsh, Warwick, R.I., assignor to Texaco Inc., New York, N.Y., a corporation of Delaware
Continuation of application Ser. No 88,937, Feb. 13, 1961. This application Mar. 10, 1964, Ser. No. 351,886
8 Claims. (Cl. 340—255)

This invention relates generally to an apparatus indicating the grounding of an electrostatically charged body, e.g., a tank truck or a marine or aeronautic vessel used to transport volatile petroleum products, and in one specific aspect, to an attaching means for such an apparatus.

This is a continuation application of my copending application for patent, Ser. No. 88,937, filed February 13, 1961.

Many tests indicate that the majority of tank truck transporters entering a petroleum products loading rack carry a substantial electrostatic charge, which, if not dissipated before the loading procedure begins, may cause a fire or explosion, should there be an electrostatic discharge during the loading of the products. This discharge may occur between the loading spout and the opening of a tank compartment, or between the rack structure or an individual contacting a truck transporter to result in the ignition of vapors within the truck transporter or of those vapors flowing to the ground.

A static charge can be accumulated also by the flow of petroleum products into the tank truck transporter compartments during the loading period. If such a charge is not drained off continuously through an electrical grounding arrangement, it may build up to a point where it will discharge to ground and result in an explosion and/or fire.

Accordingly, it is an overall object of the present invention to provide an improved means for dissipating the electrical charge which may exist on a volatile combustible tank truck transporter at the time it enters the loading rack or a marine vessel at dockside and/or which may develop during the loading operation.

Another object of the invention is to provide an improved electrical grounding arrangement which is dependable and indicates that an electrical circuit through a charged body to ground is not interrupted.

Still another object of the invention is to provide an effective electrical grounding circuit with means for indicating when such a circuit is completed.

Another object of the invention is to provide an electrical ground indicating apparatus which is simple to construct and economical to operate.

And still another object of the invention is to provide an improved means for interconnecting an electrical ground indicating apparatus with an electrically charged member.

These and other objects, advantages and features of the invention will become apparent from a consideration of the specification in the light of the figures of the accompanying drawings wherein:

FIG. 1 is a simplified showing of the basic circuit of my electrical ground indicator;

FIG. 2 is a showing of a modification of the circuit of the ground indicator disclosed in FIG. 1;

FIG. 3a is a perspective view of a magnetic grounding clamp for use with my electrical ground indicator;

FIG. 3b is a sectional view of the grounding clamp taken along the line 3b—3b of FIG. 3a; and FIG. 4 is a diagrammatic disclosure of the installation of the electrical ground indicator.

The objects of my invention are achieved by the use of relay control means which, in response to the completion of an electrical circuit to ground by the attachment of a magnet clamp to an electrically charged member, actuates a circuit to indicate the electrically grounded condition of the member.

Referring to FIG. 1, there is disclosed the basic circuit of my electrical ground indicator, including a transformer at 10, with its primary winding at 11 furnished with power by connection at the terminals 12 and 13, such power being obtained, for example, from a source of 120 volt, 60 cycle alternating current. The secondary winding 14 of the transformer 10 steps down the 120 v. A.C. supply to a nominal voltage of approximately 5 volts, with one terminal of the secondary winding being grounded at the terminal 15, while the other terminal is connected in series with a resistor 16, a relay coil 17, and a terminal at 18. A grounding clamp (not shown), adapted to be attached to the member or object to be electrically discharged to ground, is connected across the terminals 15 and 18. In response to the flow of current when the ground circuit is completed through the charged member by attachment of the clamp to the member to be electrically discharged and across the terminal 15 and 18, the relay coil 17 actuates the relay switch 19 in the indicating circuit, shown generally at 20, which has a lamp 21 in series therein and is connected across the source of power for the transformer, at 12′ and 13′. It is possible to replace the lamp by other indicating means, as, for example, audible means such as a buzzer or a bell, or an electrical set up for controlling the operation of the loading pump, e.g. by another relay means.

There is disclosed in FIG. 2, a refinement of the basic electrical ground and indicating circuit of FIG. 1, to include an explosion proof container 22, and with the same enumeration for the same or similar elements disclosed in FIG. 1. These include a hermetically sealed transformer at 10, indicated by the dotted outline, with the same 120 v. A.C. power supply to the primary winding 11 and across which the indicating circuit 20 is shown connected at 12′ and 13′. The secondary winding 14 of the transformer 10 is connected at one of its terminals to ground, as at 15a, while the other terminal is connected in series to a resistor 16, a rectifier 23, and a contact at 24. The series circuit is continued therefrom through one of a pair of conductors at 25, which conductors are joined to conductor rods at a magnet clamp 30. The free end of the other of the pair of conductors is connected to the ground at 15b. The relay coil 17 is connected to the output of the rectifier 23 and actuates the relay switch at 19 to complete the indicating circuit 20 with the lamp at 21. In conjunction with the conductors 25, there is disclosed a take up reel 25a on which the excess of the pair of conductors may be stored. The combination of the rectifier, relay coil and switch may be positioned in a sealed container, shown in dotted outline.

Referring to FIGS. 3a and 3b, the magnet clamp 30 consists of a pair of contact point assemblies 31 which are unitized by a pair of yokes 32, joined together by threaded means, e.g., a nut and bolt assembly at 32a, and a carrying handle 33 joined to said yokes. Each contact point assembly consists of a cylindrical permanent magnet 34, with an axial bore 34a, housed in a Bakelite sleeve 35. The axial bore 34a receives the conductor rod 36 of T-shape configuration and is preferably bronze, with a Stellite contact point at 36a at the T-end, with this end of the rod working in an appropriate shaped slot 34b in the magnet 34. The rod 36 is kept in resiliently mounted assembly by the screw nut and washer, at 37a and 37b respectively, and the loading springs at 38a and 38b. One end of the conductors 25 is fastened to an end of each plunger rod 36 of the assemblies 31, and is shown soldered at 39, although the nut and washer at 37a and 37b could be used as a terminal connection to receive the conductors ends, for ease of maintenance.

In use, the magnet clamp is placed on the tank transporter to be loaded, and normally the indicating circuit will light up showing that there is a good contact and that the transporter is grounded. If there is no lighting (or other indication), slight movement of the clamp will cause the contact points to dig through paint or dirt to obtain a good contact and so lead to an indication of grounding. In case the tank transporter is made of aluminum or other non-ferrous material, the weight of the magnet clamp is enough to make contact through the point 36a, and usually dome cover assemblies are constructed of a ferrous material to which the magnet clamps will hold. With this type of clamp, positive disengagement, because of careless loading, is unnecessary.

In operation, the electrical ground circuit is completed by the application of the magnet clamp 30 to the member to be grounded, e.g. the magnets 34 are positioned engage a part of a tank truck 26 or rest thereon. When the contact point engagement is made, a minute amount of current (of about .0015 ampere) flows from one contact point of the clamp through the portion of the truck or other charged body to be grounded and out of the other contact point of the clamp through one of the pair of conductors to the ground connection at 15b. The small amount of current flow causes the relay to operate, closing the switch at 19, completing a circuit and so energizing the indicating means to show that an electrical ground has been established. With the low voltage of approximately 5 volts and the small amount of current drawn by the relay, it is virtually impossible to obtain a spark when making or breaking the contact with the truck. As mentioned for FIG. 1, the relay coil may be utilized in a control scheme to interlock the operation of a solenoid valve to prevent the loading operation from taking place unless the truck has been grounded electrically.

As disclosed in FIG. 2, there are separate ground contacts at 15a and 15b, respectively for one end of the secondary winding of the transformer and for one of the pair of conductors in order to assure the complete electrical grounding of the charged member, even though it may be possible to interconnect the ground connection as indicated by the dotted line at 15c.

FIG. 4 is a diagrammatic showing of the installation of my improved electrical ground indicator at a loading rack. The ground indicator in its explosion proof container is at 22, with the indicating light or other means at 21, the double conductors at 25, with the take up reel at 25a, and the magnet clamp at 30 for engagement with a tank truck at 26.

Thus there has been shown and described a device for obtaining a reliable static ground on a tank truck or other receptacle which contains volatile combustible products and is capable of building up an electrical charge, with an indication that an electrical charge, with an indication that an electrical ground connection has been made before filling operations are started and while filling operations proceed.

Other modifications and variations of the invention, as hereinbefore set forth, may be made without departing from the spirit and scope thereof, and therefore only such limitations should be imposed as are indicated in the appended claims.

I claim:

1. A device for use in electrically grounding a charged body comprising, in combination, a series circuit through said charged body to ground including a source of electrical energy, a relay control means, and magnetic clamping means with a ground connection for attachment to said charged body for completing said series circuit therethrough to ground, and means, connected across said source of electrical energy, for indicating that said series circuit has been grounded electrically including a switch responsive to said relay control means.

2. In the device defined in claim 1, said clamping means comprising a pair of contact point assemblies each containing a permanent magnet and a conductor rod housed therein, the conductor rods being interconnected into said series circuit through said charged body at spaced apart points.

3. An apparatus for use in electrically grounding a charged body comprising the combination of a source of electrical energy including a transformer and a series circuit through said charged body to ground joined to the output of said transformer including a relay control means and magnetic clamping means with a ground connection for attachment to said charged body for completing said series circuit therethrough to ground, and means, connected across said source of electrical energy, for indicating that said series circuit has been grounded electrically including a switch responsive to said relay control means.

4. In the apparatus defined in claim 3, said clamping means comprising a pair of contact point assemblies each containing a permanent magnet and a conductor rod housed therein, the conductor rods being interconnected into said series circuit through said charged body.

5. In the apparatus as defined in claim 3, one end of said output of said transformer being connected to ground and separate from the ground connection for said clamping means.

6. An apparatus comprising, in combination, a transformer and a source of power connected thereto, relay control means, and means for actuating said relay control means interconnected through an electrostatically charged member to ground in series with the output of said transformer and comprising a rectifier and clamping means connected to ground for attachment to a charged member to be grounded electrically, said relay control means being responsive to said rectifier, and means, joined to the input to said transformer, for indicating the electrical grounding of said member when said clamping means have been attached, said clamping means comprising a magnet clamp including a pair of contact point assemblies, and means for joining said assemblies together, said assemblies each comprising a permanent magnet and a conductor rod housed therein, the rods of said assemblies being in the series circuit completed through said charged body to ground with said means for actuating said relay control means.

7. In the device as defined in claim 6, said rectifier being in series with said source of power.

8. An apparatus to discharge and prevent the accumulation of an electric charge on a body and to indicate its electrically grounded condition comprising, in combination, a source of power including a transformer, means for providing alternating current energy thereto, means for electrically grounding a body comprising a series circuit of an impedance, a rectifier and clamping means interconnecting one terminal of the secondary winding of said transformer through said body with a ground, the other terminal of said secondary winding being joined to a ground separate from that of said series circuit, and a relay control means connected across the rectifier output, and means for indicating the electrically grounded condition of said series circuit connected across said suorce of alternating current energy and being responsive to said relay control means upon completion of the series circuit to ground, said clamping means comprising a pair of contact point assemblies each containing a permanent magnet and a conductor rod housed therein, the conductor rods contacting said body at spaced apart points to complete said series circuit therethrough to ground.

No references cited.

NEIL C. READ, *Primary Examiner.*

D. K. MYER, *Assistant Examiner.*